Patented Apr. 20, 1948

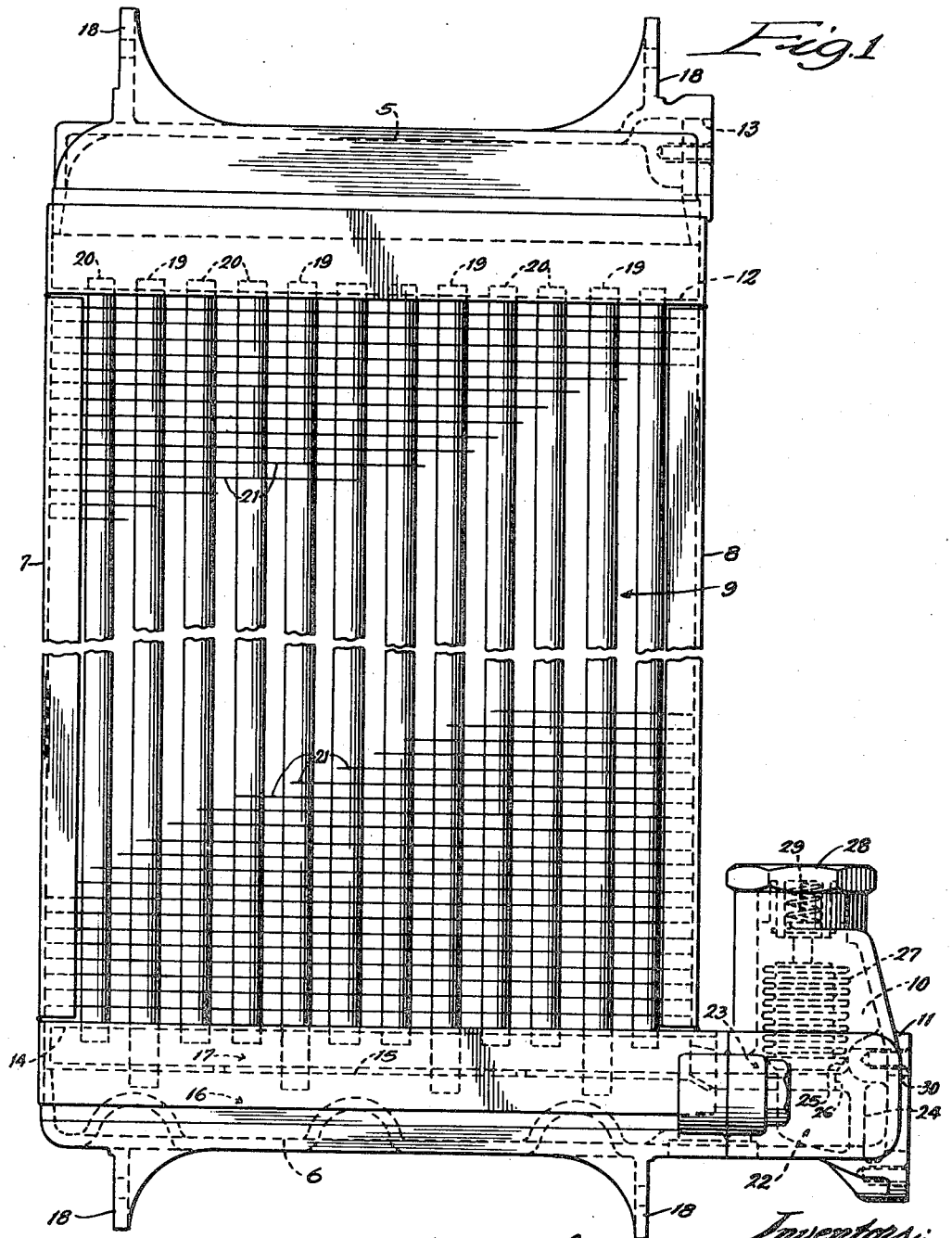

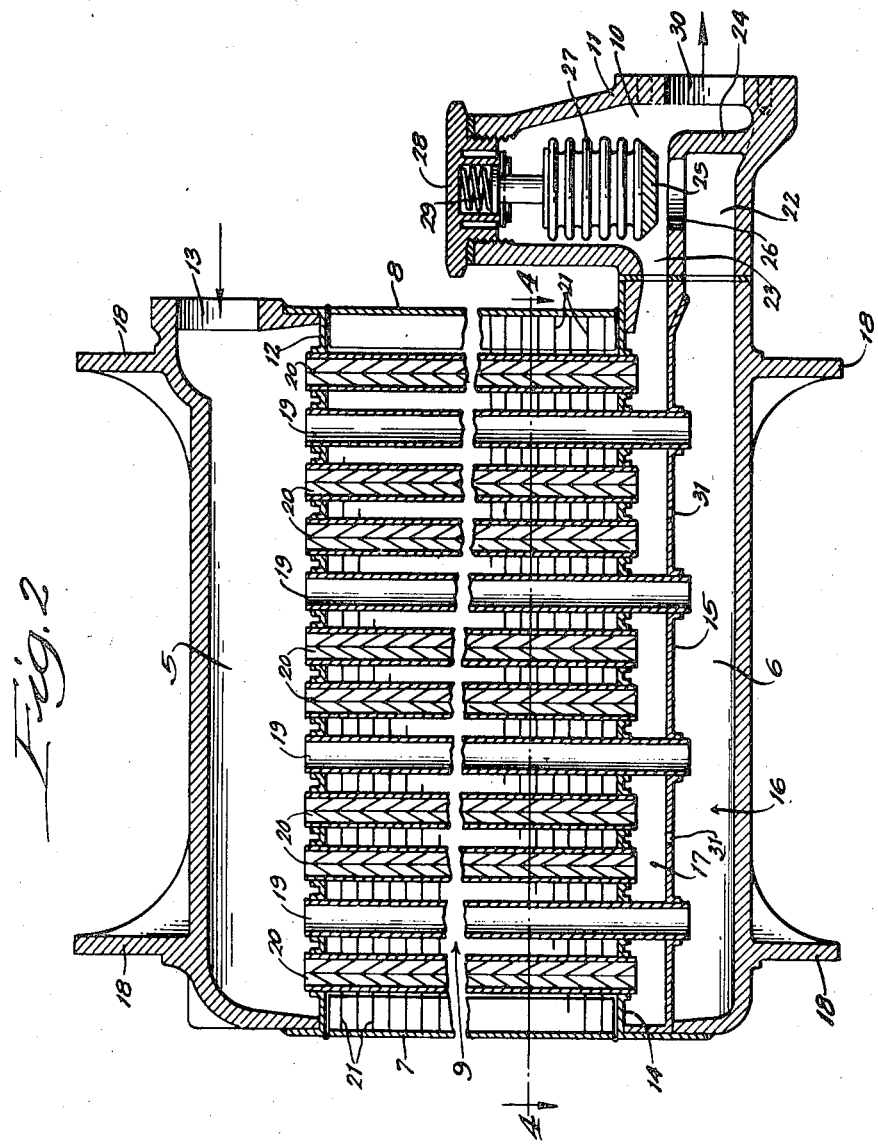

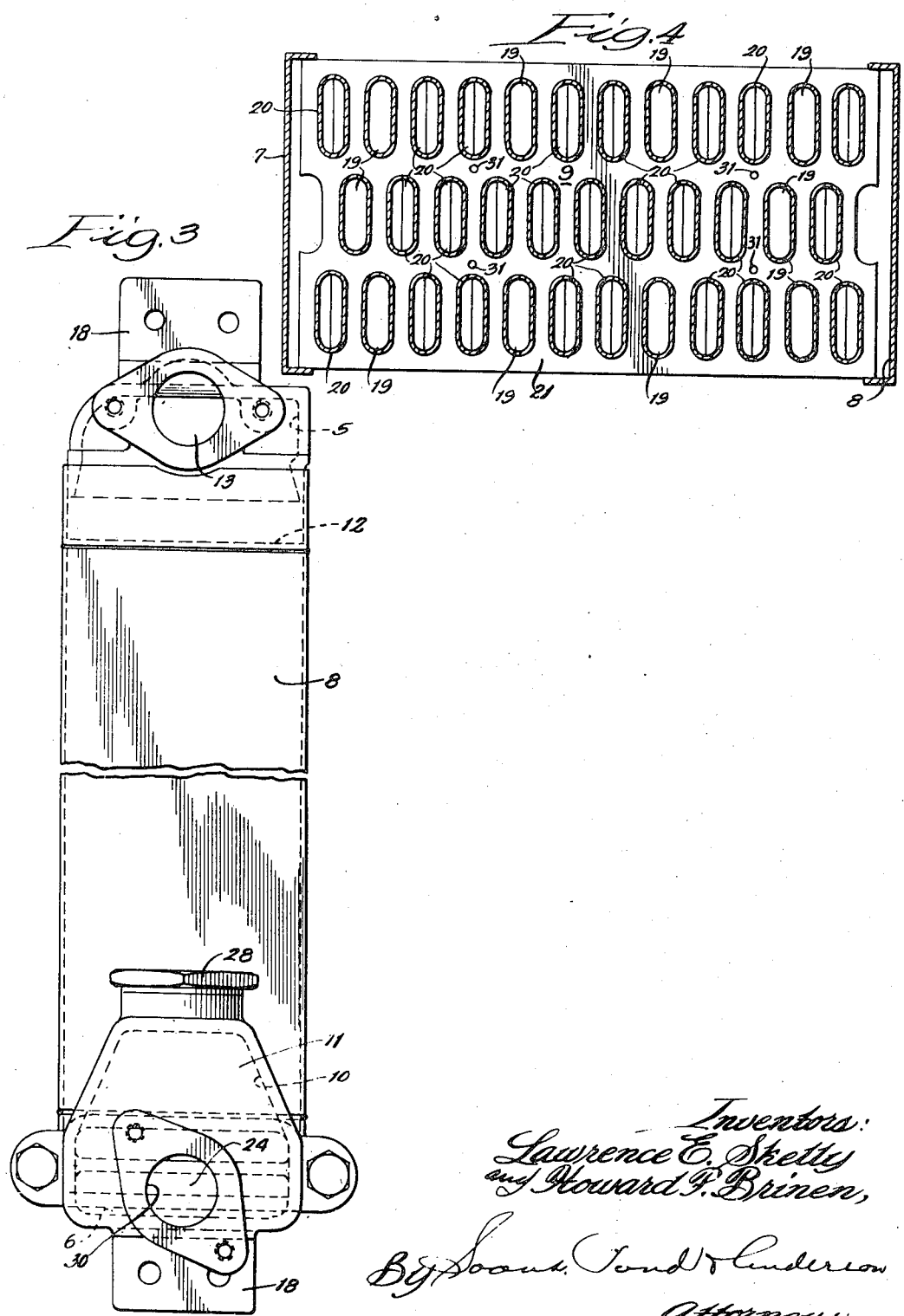

2,439,871

UNITED STATES PATENT OFFICE 2,439,871

FLUID TEMPERATURE CONTROLLING DEVICE

Lawrence E. Skelly, New Haven, Conn., and Howard F. Brinen, Racine, Wis., assignors to Young Radiator Company, Racine, Wis., a corporation of Wisconsin Original application September 18, 1942, Serial No. 458,904. Divided and this application January 8, 1945, Serial No. 571,814

1 Claim. (Cl. 257—2)

In the operation of modern heavy-type automotive equipment, propelled by internal combustion engines, it has become increasingly imperative to provide highly effective means for controlling the temperature of the lubricating oil required for such engines. A mechanism for controlling oil temperatures, in order to be acceptable, must embody four characteristics. First, it must secure a quick thaw-out and initial warm-up of congealed oil in the normal oil flow path. Second, it must possess high efficiency in heat dissipation during exceptional as well as normal service demands. Third, it must be capable of using either air or water as a cooling medium. Fourth, it must be possessed of the utmost compactness in order to economize on space. These requirements are especially imperative for automotive equipment employed in combat service in modern warfare.

The main objects of this invention, therefore, are to provide an improved form of fluid temperature control device of a type particularly suitable for regulating the temperature and flow of lubricating oil for internal combustion engines; to provide a device of this kind particularly suitable for use with internal combustion engines required for heavy land and marine craft, yet capable of adaptation for use with aircraft engines; to provide a fluid temperature control device of this kind constructed with dual fluid flow paths of differing heat exchange capacities and equipped with regulating means for automatically directing the mass flow of fluid through such alternative paths depending upon the viscous condition of the fluid and the demands of the engine; to provide improved means for facilitating the thawing out of one of said fluid-flow paths when the fluid is flowing through the other fluid-flow path and subsequently continuing a partial flow of fluid through the other said fluid-flow path when the main flow is directed through said one fluid-flow path; and to provide a fluid temperature control device of this kind which is of simple and compact arrangement, and economical and effective in operation.

A specific embodiment of this invention is shown in the drawings, wherein

Fig. 1 is a side elevation of a preferred form of the fluid temperature control device;

Fig. 2 is a vertical longitudinal cross-sectional view of the same;

Fig. 3 is an end-view taken from the right of Fig. 1; and

Fig. 4 is a cross-sectional view taken on the line 4—4 of Fig. 1.

Any suitable embodiment of this improved fluid temperature controlling device comprises a pair of headers 5 and 6 supported in appropriate spaced relationship by means of end plates 7 and 8 and connected together by two groups of conduits or tubes 9 providing alternative fluid flow paths the passage of fluid through which is controlled by a valve mechanism 10 mounted in a housing 11 secured at one end of the header 6.

In the herein illustrated embodiment, the header 5 is in the form of a casting the open face of which is closed by means of a plate 12 so as to form a single chamber communicating with all of the tubes 9, the upper ends of which extend through suitable flanged apertures formed in the plate 12. At one end of the header 5 is formed an inlet 13 through which fluid enters the chamber.

The header 6, as herein shown, is likewise in the form of a casting across the open face of which extends a plate 14 and inwardly of which is secured a partition 15 which serves to divide the header 6 into two chambers 16 and 17 having contiguous outlets providing communication with the valve housing 11. The plates 12 and 14 and the partition 15 have flanged apertures through which protrude the ends of the tubes 9.

Both of the headers 5 and 6 have lugs or extensions 18 formed thereon which permit the device to be suitably supported or mounted in operative connection with the system wherewith it is to control the fluid flow and the consequent temperature thereof.

The tubes 9 are herein shown to be of the flat type so extensively used in heat exchange devices of this kind, and are arranged in two groups. The first group of tubes comprises the majority of the tubes 9 which extend through and have their ends terminating slightly inwardly of the inner faces of the plates 12 and 14. These tubes, therefore, provide direct communication between the one chamber of the header 5 and the inner chamber 17 of the header 6. The other group of tubes 19 also have their upper ends extending through the header plate 12 but their lower ends continue beyond the plate 14 and through the partition 15 terminating slightly inwardly thereof. These tubes, thus, provide communication between the single chamber of header 5 and the lower chamber 16 of the header 6. As clearly shown by Figs. 2 and 4 this second group of tubes is small in number compared with the tubes in the first-mentioned group. As will be further noted the tubes of the second group are spaced at intervals among the tubes of the first-mentioned group.

Internal fins 20, preferably of the type shown in Patent No. 2,359,288, issued October 3, 1944, are incorporated in all of the tubes 9 of the first group. Obviously, these fins increase the heat-exchange surface exposed to the fluid flow therethrough and naturally serve to accelerate the dissipation of heat from the fluid passing through them. On the other hand the tubes 19, having no internal fins, present an open flow path for fluid and one that dissipates a much lesser amount of heat from such fluid.

All of the tubes 9 extend through and have intimate physical contact with a series of closely spaced fins 21 arranged between and parallel to the headers 5 and 6. These provide a path for heat transference between the tubes 9 and from the fluid in the tubes to another fluid passing transversely around and between the fins 21 and tubes 9.

The valve housing 11 is secured at one end of the header 6 so that chambers 22 and 23, formed therein on opposite sides of the partition 24, are in direct communication respectively with the chambers 16 and 17 of the header 6. A valve member 25 for controlling a port 26 in the partition 24 is mounted on a thermostat 27 which is suspended from a cap 28 screwed into the housing 11. A spring 29 provides relief for the valve member 25 to permit an unseating thereof if and when the thermostat should be actuated to inopportunely hold the valve 25 seated against excessive pressure in the chamber 16. An outlet 30 is provided in the housing 11 to which fluid is directed from the chambers 22 and 23.

The thermostat 27 may be of any of the types generally used for similar purposes.

The main feature of this invention, whereby it distinguishes from application Ser. No. 458,904, now Patent No. 2,395,943, dated March 5, 1946, filed September 18, 1942, of which this application is a division, involves the provision of a limited number of apertures 31 formed in the partition 15 so as to provide communication between the chambers 16 and 17. The function of these apertures 31 is two-fold. Their first function is to facilitate a thawing out of congealed oil in the chamber 17. Their second function is to permit a partial flow of fluid through the tubes 19, when the major flow of fluid is being directed through said internally-finned tubes 9, and thereby continue to have the benefit of the heat transfer capacities of such tubes concurrently with the similar use of all said internally-finned tubes.

If, in initiating the use of this heat exchange device, the oil is extremely viscous or perhaps congealed in the internally-finned tubes, the oil flow will be through the unrestricted tubes 19 and the chamber 16. During such oil flow the apertures 31 will cause jets of hot oil to penetrate into the chamber 17 and accelerate the thawing out of the highly-viscous or congealed oil therein and thereby hasten the oil flow through the internally-finned tubes.

When the main oil flow is through the internally-finned tubes, were it not for the arrangement of these apertures 31, all flow of liquid through the tubes 19 would be discontinued as soon as the valve 25 had closed the port 26. This would mean a complete loss of the heat transfer capacity of these tubes, so long as the valve 25 remained closed to force the fluid to travel only through the chamber 17.

In order to make the tubes 19 effective for thawing out the internally-finned tubes, it is necessary to have the tubes 19 arranged at frequent intervals in the group of tubes 9. Generally this would mean a ratio of between 1 to 3 and 1 to 5 of the unobstructed tubes 19 to the internally-finned tubes 9. Thus a substantial portion of the tubes would be completely out of use during normal operation of the device when the fluid was flowing only through chamber 17. However, the provision of apertures 31 bring these unobstructed tubes into use by allowing a small amount of fluid to continue to flow through them. Although the heat transference of the fluid passing through the unobstructed tubes 19 would be nothing comparable to that of fluid flowing through the internally-finned tubes, nevertheless, it will provide an added cooling effect that in some circumstances may be sufficiently critical to keep the temperature of the fluid flow below a too high degree.

The operation of the device is believed to be more or less obvious.

Assuming the device is being used for cooling the lubricating oil for an engine, oil under pressure enters at 13. If this oil is of a low temperature its viscosity will be too high to permit ready flow through the internally-finned tubes. Or, the oil in these tubes may be so congealed that it will not flow. Accordingly, the incoming oil will tend to seek the path of least resistance. Obviously this will be through the tubes 19. The oil being of low temperature, the thermostat 27 will react to open the port 26 and allow the oil to flow readily from the chamber 16 out through the outlet 30. As the flow of the oil through this path continues its temperature will begin to rise. The heat of the oil passing through the unobstructed tubes 19 will be communicated through the fins 21 to the internally-finned tubes 20. This will cause a thawing of the highly-viscous or congealed oil in these tubes. This thawing out of the finned tubes will be supplemented and accelerated by the jets of hot oil entering the chamber 17 through the apertures 31. As soon as the oil in the internally-finned tubes is thawed enough to move, a flow of oil through these tubes into the chamber 17 will parallel the flow of oil through the unobstructed tubes 19. The rising temperature of the oil passing the thermostat 27 will cause it to react to gradually cut off the flow through the port 26.

As soon as the valve port 26 is closed the main oil flow will be from the single chamber of the header 5 through the internally-finned tubes 9 to the internal chamber 17 of the header 6 and out through the outlet 30. However, because of the apertures 31 in the partition 15, the oil in the unobstructed tubes 19 will continue to flow through the apertures 31 into the chamber 16. This partial circulation of oil through the tubes 19 will continue to cause some dissipation of heat therefrom to supplement the heat dissipation caused by the major flow of oil through the internally finned tubes. Small though that heat dissipation may be through the tubes 19, it is material and at times may even be of critical significance.

Variations and modifications in the details of the structure and arrangement of parts may be resorted to within the spirit and coverage of the appended claim.

We claim:

An oil temperature control device of the class described comprising a pair of headers one of which has a single chamber with an oil inlet and the other of which is partitioned to provide double chambers with contiguous outlets and which headers are connected together in opposed relationship by a plurality of tubes, occasional of said tubes having unobstructed oil flow therethrough and providing communication between said single-chamber header and one of the chambers of said double chamber header, the remainder of said tubes having heat transfer means obstructing the oil flow therethrough and providing communication between said single-chamber header and the other chamber of said double-chamber header, a multiplicity of closely-spaced fins through which said tubes extend in heat transfer relationship, a valve housing with outlet connected to said double-chamber header outwardly of the outlets for said chambers, said valve housing being partitioned to provide valve chambers communicating respectively with said header chambers and having a port affording communication between said valve-housing chambers, and a thermostatically-operated valve exposed in said valve-housing to the flow of oil from both of said header chamber outlets to said valve-housing outlet, said valve being normally biased to open said partition port when the oil flow is free to flow through said occasional tubes at a time when the oil flow through said remainder of tubes is retarded by the viscosity of the oil, the partition separating the chambers of said double-chamber header having apertures providing communication between said chambers so as to permit a continuous small flow of oil from said other chamber to said one chamber of said double-chamber header.

LAWRENCE E. SKELLY.
HOWARD F. BRINEN.

REFERENCES CITED

The following references are of record in the file of this patent:

UNITED STATES PATENTS

| Number | Name | Date |
|---|---|---|
| 2,007,590 | Baillio | July 9, 1935 |
| 2,289,097 | Brinen | July 7, 1942 |
| 2,293,960 | Young | Aug. 25, 1942 |
| 2,322,047 | Mormile | June 15, 1943 |
| 2,352,704 | Garner | July 4, 1944 |
| 2,376,198 | Shaw | May 15, 1945 |